United States Patent [19]

Broden

[11] Patent Number: 5,668,322

[45] Date of Patent: Sep. 16, 1997

[54] APPARATUS FOR COUPLING A TRANSMITTER TO PROCESS FLUID HAVING A SENSOR EXTENSION SELECTIVELY POSITIONABLE AT A PLURALITY OF ANGLES

[75] Inventor: David A. Broden, Minnetrista, Minn.

[73] Assignee: Rosemount Inc., Eden Prairie, Minn.

[21] Appl. No.: 661,302

[22] Filed: Jun. 13, 1996

[51] Int. Cl.$^6$ .............................. G01L 7/00; E03B 11/00
[52] U.S. Cl. .............................................. 73/756; 137/798
[58] Field of Search .................... 73/706, 756, 861.66; 122/451.1; 137/112, 340, 343, 356, 385, 489, 552, 594, 595, 597, 608, 625.64, 798, 881, 884; 251/76, 308; 261/3

[56] References Cited

U.S. PATENT DOCUMENTS

| | | | |
|---|---|---|---|
| Re. 34,610 | 5/1994 | Miller et al. | 137/597 |
| D. 296,995 | 8/1988 | Lee | D10/46 |
| D. 297,315 | 8/1988 | Pierce et al. | D10/85 |
| D. 317,266 | 6/1991 | Broden et al. | D10/46 |
| D. 318,432 | 7/1991 | Broden et al. | D10/46 |
| 1,272,344 | 7/1918 | Bristol . | |
| 1,797,591 | 3/1931 | Sartakoff . | |
| 2,355,270 | 8/1944 | Campbell | 122/451.1 |
| 2,804,879 | 9/1957 | Hanson | 137/112 |
| 2,871,881 | 2/1959 | Hewson | 137/597 |
| 2,943,640 | 7/1960 | James | 137/594 |
| 2,949,130 | 8/1960 | Knight et al. | 137/552 |
| 3,228,665 | 1/1966 | Dolan | 261/3 |
| 3,450,157 | 6/1969 | Hewson | 137/595 |
| 3,628,566 | 12/1971 | Caree | 137/594 |
| 3,633,618 | 1/1972 | Blackmore | 137/597 |
| 3,653,405 | 4/1972 | Nelson | 137/594 |
| 3,768,511 | 10/1973 | Bias | 137/597 |
| 3,817,283 | 6/1974 | Hewson | 137/608 |
| 3,894,559 | 7/1975 | DePuy | 137/595 |
| 3,974,998 | 8/1976 | Wood | 251/76 |
| 4,092,865 | 6/1978 | Strybel | 73/756 |
| 4,182,362 | 1/1980 | Hewson et al. | 137/340 |
| 4,193,420 | 3/1980 | Hewson | 137/356 |
| 4,215,721 | 8/1980 | Hetherington et al. | 137/606 |

(List continued on next page.)

FOREIGN PATENT DOCUMENTS

| | | |
|---|---|---|
| 977650 | 11/1975 | Canada . |
| 1 206 824 | 9/1970 | France . |
| 1 381 887 | 1/1975 | France . |
| 1 467 957 | 3/1977 | France . |
| 1 572 814 | 8/1980 | France . |
| 863 396 | 1/1953 | Germany . |
| 24 24 839 A1 | 12/1975 | Germany . |
| 569898 | 11/1957 | Italy . |
| 56-129659 | of 1981 | Japan . |
| 2 086 535 | 5/1982 | United Kingdom . |
| 2 260 387 | 4/1993 | United Kingdom . |
| 2 271 164 | 4/1994 | United Kingdom . |
| WO93/05329 | 3/1993 | WIPO . |

OTHER PUBLICATIONS

"Model SBZ–43", from DA Manufacturing Co., 1978.
Catalogue 4256–GB, "Manifolds", p. 11.
"Minimatic Three Valve Manifold", from DA Manufacturing Co., 1981.

(List continued on next page.)

*Primary Examiner*—Richard Chilcot
*Assistant Examiner*—William L. Oen
*Attorney, Agent, or Firm*—Westman, Champlin & Kelly, P.A.

[57] ABSTRACT

A transmitter of the type used in the process control industry includes a sensor for sensing a process variable and a transmitter body having a sensor coupling. A sensor extension couples to the sensor coupling and includes a sensor coupling face. A first flange interface has a process face which provides a process connection and a sensor face which provides a sensor connection. A passageway couples the process connection to the sensor connection. The first flange interface is coupled to the sensor extension by a coupling mechanism. The sensor extension and the first flange interface may be moved throughout, a range of positions relative to one another.

24 Claims, 12 Drawing Sheets

U.S. PATENT DOCUMENTS

| | | | |
|---|---|---|---|
| 4,319,492 | 3/1982 | Hewson et al. | 73/756 |
| 4,367,765 | 1/1983 | Moretti et al. | 137/881 |
| 4,429,711 | 2/1984 | Schomer | 137/385 |
| 4,466,290 | 8/1984 | Frick | 73/756 |
| 4,582,089 | 4/1986 | Nimberger | 137/884 |
| 4,602,657 | 7/1986 | Anderson, Jr. et al. | 137/595 |
| 4,655,074 | 4/1987 | Robertson, Jr. et al. | |
| 4,672,728 | 6/1987 | Nimberger | 29/157 |
| 4,672,995 | 6/1987 | Powell | 137/489 |
| 4,711,268 | 12/1987 | Coleman | 137/597 |
| 4,738,276 | 4/1988 | Adams | 137/343 |
| 4,745,810 | 5/1988 | Pierce et al. | 73/706 |
| 4,798,089 | 1/1989 | Frick et al. | 73/706 |
| 4,828,221 | 5/1989 | Scobie et al. | 251/308 |
| 4,833,922 | 5/1989 | Frick et al. | 73/756 |
| 4,865,360 | 9/1989 | Adams | |
| 4,887,645 | 12/1989 | Kerger | 137/884 |
| 4,921,072 | 5/1990 | Divisi | 184/7.4 |
| 4,977,917 | 12/1990 | Adams | 137/597 |
| 4,993,754 | 2/1991 | Templin, Jr. | 285/189 |
| 5,036,711 | 8/1991 | Good | 73/861.66 |
| 5,036,884 | 8/1991 | Miller et al. | 137/597 |
| 5,048,569 | 9/1991 | Stoll et al. | 137/625.64 |
| 5,117,867 | 6/1992 | Adams | 137/597 |
| 5,209,258 | 5/1993 | Sharp et al. | 137/343 |
| 5,248,167 | 9/1993 | Petrich et al. | 285/23 |
| 5,277,224 | 1/1994 | Hutton | 137/597 |
| 5,303,733 | 4/1994 | Nelson | 137/505.38 |
| 5,339,863 | 8/1994 | Van Wie | 137/798 |
| 5,449,294 | 9/1995 | Rench et al. | 437/225 |
| 5,494,071 | 2/1996 | Bell et al. | 137/597 |

OTHER PUBLICATIONS

Catalog: *AGCO Manifolds*, Anderson, Greenwood & Co., Houston TX 77081, Oct. 1980.

"New Compact Direct–Mount™ System Eliminates Need for Coplanar Flange", PGI International, 16101 Vallen Drive, Houston TX 77041 Sep. 19, 1995.

"Integral Manifolds" brochure, PGI International, 16101 Vallen Drive, Houston, TX 77041 (undated).

"Installation", MI 020–403, Jul. 1995, pp. 9–13 and 5 and 7.

"Instrument Valves and Manifolds", by Astava B.V., 1992, pp. 1–32.

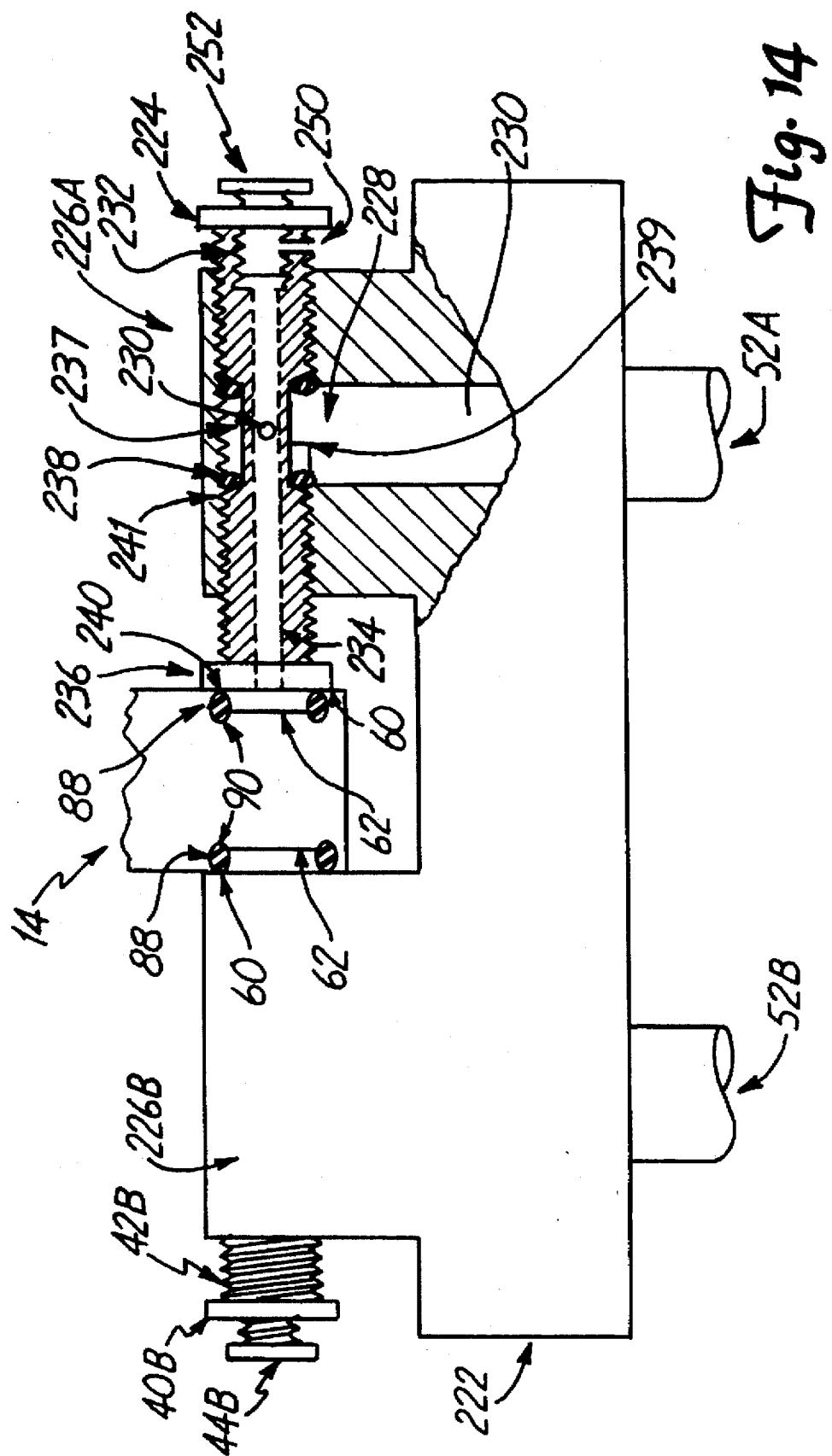

5,668,322

1

APPARATUS FOR COUPLING A TRANSMITTER TO PROCESS FLUID HAVING A SENSOR EXTENSION SELECTIVELY POSITIONABLE AT A PLURALITY OF ANGLES

BACKGROUND OF THE INVENTION

The present invention relates to transmitters used in the process control industry. More specifically, the present invention relates to coupling the transmitter to process fluid.

Transmitters are used in the process control industry to measure a process variable of the process. The process variable is used to control the process and, for example, is transmitted over a two-wire process control loop to a control room. Various process variables include pressure, differential pressure, flow, temperature, turbidity and product level.

Various types of process transmitters are known in the art. For example, U.S. Pat. No. 4,466,290 entitled APPARATUS FOR CONVEYING FLUID PRESSURES TO DIFFERENTIAL PRESSURE TRANSDUCER issued Aug. 21, 1984 to Frick discloses a differential pressure transmitter having a two diaphragms which lie generally in the same plane. A flange is used to couple the transmitter to impulse piping. Another type of transmitter uses a process connection which is oriented 90° relative to that shown in the Frick patent. Such a transmitter is shown in FIG. 4 of U.S. Pat. No. 4,833,922, entitled MODULAR TRANSMITTER, issued to Frick et al.

There is an ongoing need for improved flanges and transmitter configurations for coupling the sensor of the transmitter to the process fluid.

SUMMARY OF THE INVENTION

The present invention provides a flange and transmitter configuration for coupling a sensor of the transmitter to process fluid. The transmitter includes a transmitter body having a sensor coupling. A sensor extension couples to the sensor coupling and has a sensor coupling face and an opposing face which is opposite the sensor coupling face. A first flange interface has a process face which provides a process connection to, for example, impulse piping. The first flange interface also includes a sensor face which provides a sensored connection and is adapted for coupling to the sensor coupling face of the sensor extension. The flange interface includes a passageway therethrough coupling the process connection to the sensor connection. In one embodiment, the sensor face forms an angle of approximately 90° with the process face. A coupling mechanism couples the sensor connection of the first flange interface to the sensor coupling face of the sensor extension.

In one embodiment, a second flange interface is provided having a sensor face. The coupling mechanism couples the sensor connection of the first flange interface to the sensor coupling face of the sensor extension and also couples the sensor face of the second flange interface to the opposing face of the sensor extension whereby the sensor extension is secured therebetween. The second flange interface includes a passageway extending therethrough coupling a process connection of the second flange interface to a sensor connection of the sensor face thereby conveying the process fluid to the opposing face of the sensor extension.

BRIEF DESCRIPTION OF THE DRAWINGS

FIG. 14 is a cut away view showing a manifold and sensor extension in accordance with another embodiment.

DETAILED DESCRIPTION OF THE PREFERRED EMBODIMENTS

Figure 1:
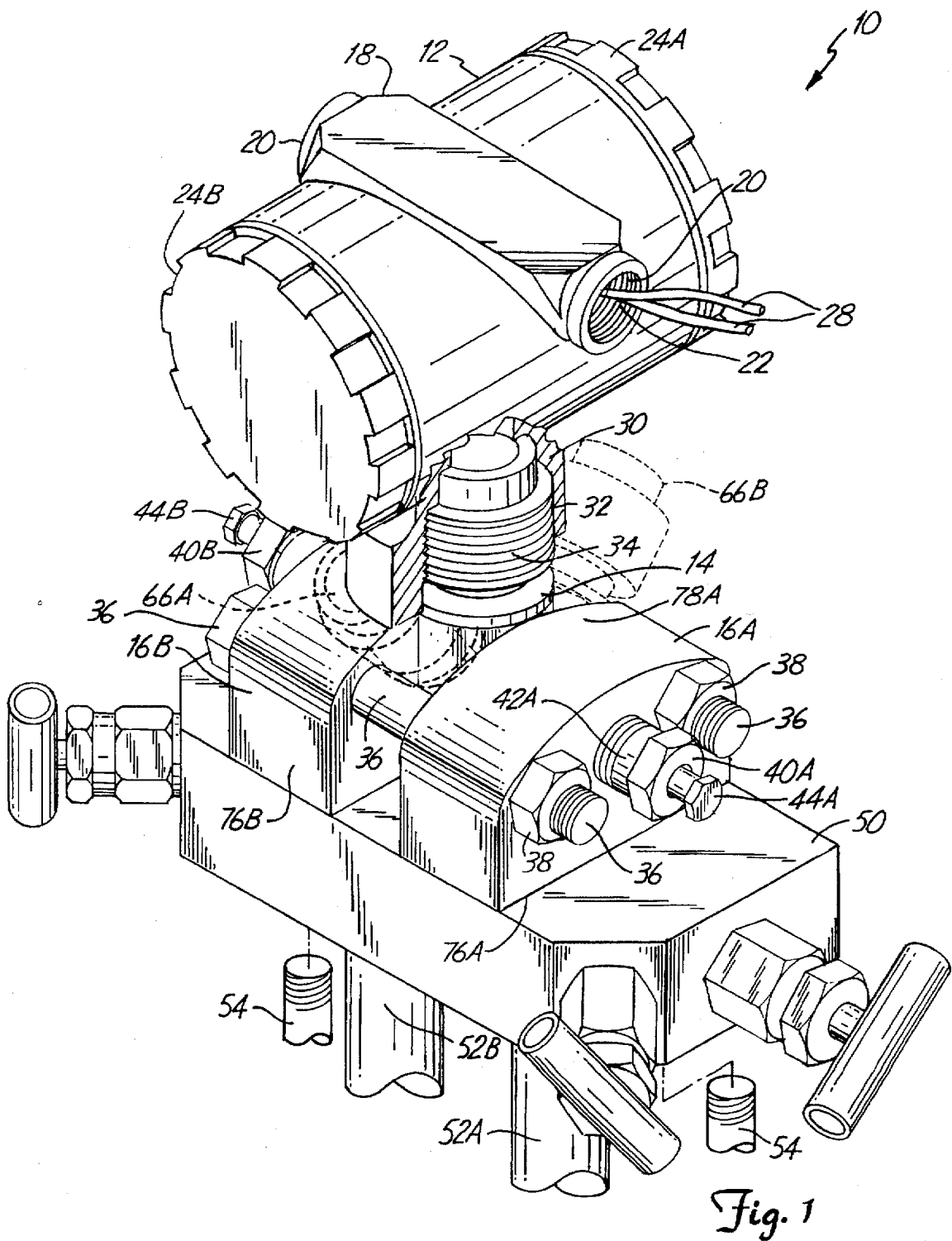
FIG. 1 is a perspective view showing a transmitter and flange in accordance with one embodiment of the present invention.

FIG. 1 is a perspective view showing transmitter 10 in accordance with one embodiment of the present invention. Transmitter 10 provides an improved process connection for coupling transmitter 10 to process fluid. Transmitter 10 includes transmitter body 12, sensor extension 14 and flange interfaces 16A and 16B. Transmitter body includes face plate 18, loop coupling 20 having threads 22 and end caps 24A and 24B. As shown in FIG. 1, transmitter body 12 is cylindrical having opposing end caps 24A and 24B. Loop couplings 20 are adapted to threadably receive a conduit (not shown) carrying process control loop wiring 28. Transmitter body 12 also includes sensor coupling 30 which comprises an opening having threads 32 formed therein positioned opposite face plate 18. Sensor coupling 30 is adapted to threadably receive sensor extension 14 which includes threads 34. Sensor extension 14 is sandwiched between flange interfaces 16A and 16B which are held together and coupled to sensor extension 14 by bolts 36 secured by nuts 38. Flange interfaces 16A and 16B include vent valves 40A and 40B which are threadably received in interfaces 16A and 16B and include threaded vent plugs 42A and 42B and vent stems 44A and 44B. Flange interfaces 16A and 16B are adapted for coupling to coplanar manifold 50 coupled to impulse piping 52A and 52B, respectively. Flange interfaces 16A and 16B are secured to manifold 50 by bolts 54 which are threadably received in flange interfaces 16A and 16B.

Figure 2:
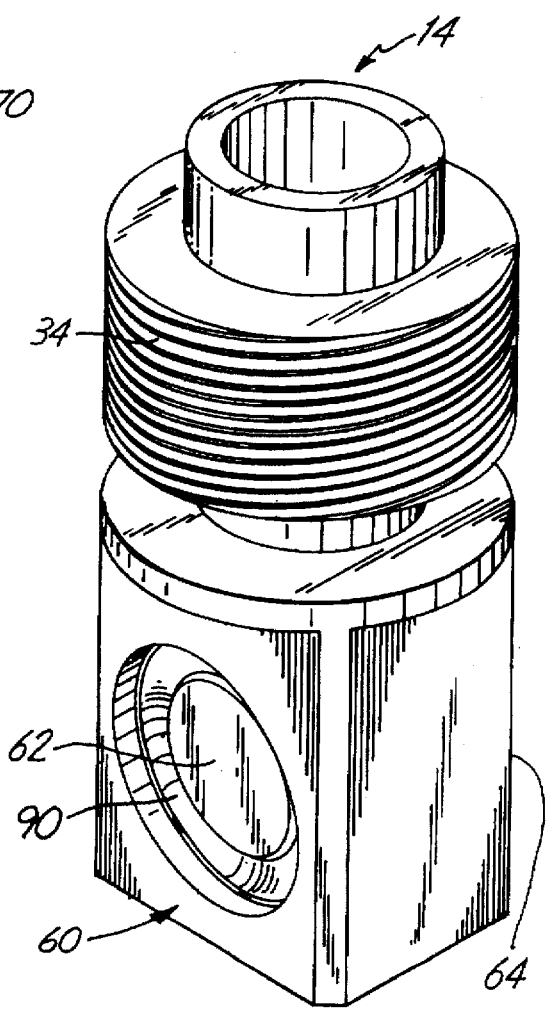
FIG. 2 is a perspective view of a sensor extension used in the embodiment of FIG. 1.

In contrast with prior art techniques, one aspect of the present invention uses a small diameter sensor interface (see 62 in FIG. 2). This allows sensor extension 14 to be secured between flange interfaces 16A and 16B with only two bolts 36. Even under high pressure connections, the reduced diameter sensor is secured by the clamping force of bolts 36.

FIG. 2 is a perspective view of sensor extension 14 showing sensor coupling face 60 having a recessed sensor interface 62 formed therein. An opposing face 64 is positioned opposite sensor coupling face 60 and, in one embodiment, also includes a recessed sensor interface (not shown) similar to interface 62 for receiving a second pressure. In one embodiment, the sensor is located in sensor extension 14 and is directly exposed to process fluid. In another embodiment, the sensor is isolated from the process fluid by an isolation diaphragm. In yet another embodiment, the sensor is spaced apart from the recessed sensor interface 62, for example in transmitter body 12, and is coupled to the process fluid by a coupling such as a small oil tube which transmits pressure. It should be understood that the particular location, configuration and coupling of the sensor to process fluid may be varied and all configurations are within the scope of the present invention. Further, the present invention is applicable to any type of sensor, for example, pressure, differential pressure, flow, turbidity or temperature and the invention is not limited to any particular sensor type. For example, interface 62 may receive process fluid, either static or flowing fluid, therethrough. Referring back to FIG. 1, transmitter body 12 can be moved (i.e. rotated) between positions 66A and 66B relative to flange interfaces 16A and 16B. Movement beyond positions 68A and 68B is blocked by bolts 36 which contact sides of sensor extension 14.

Figure 4:
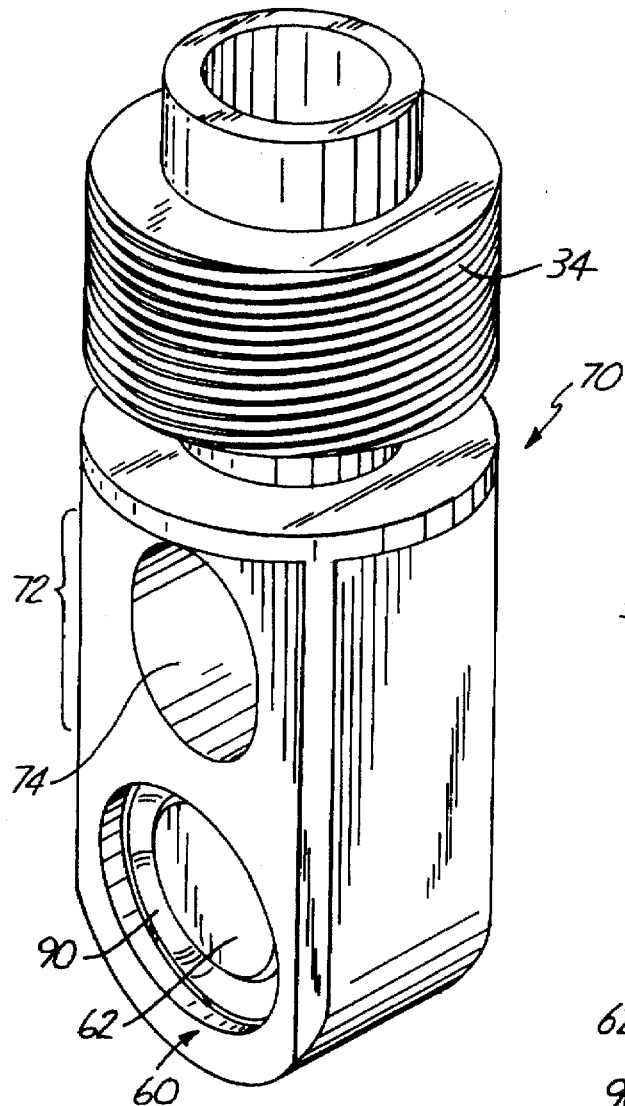
FIG. 4 is a perspective view showing a sensor extension in accordance with the embodiment of FIG. 3.
Figure 3:
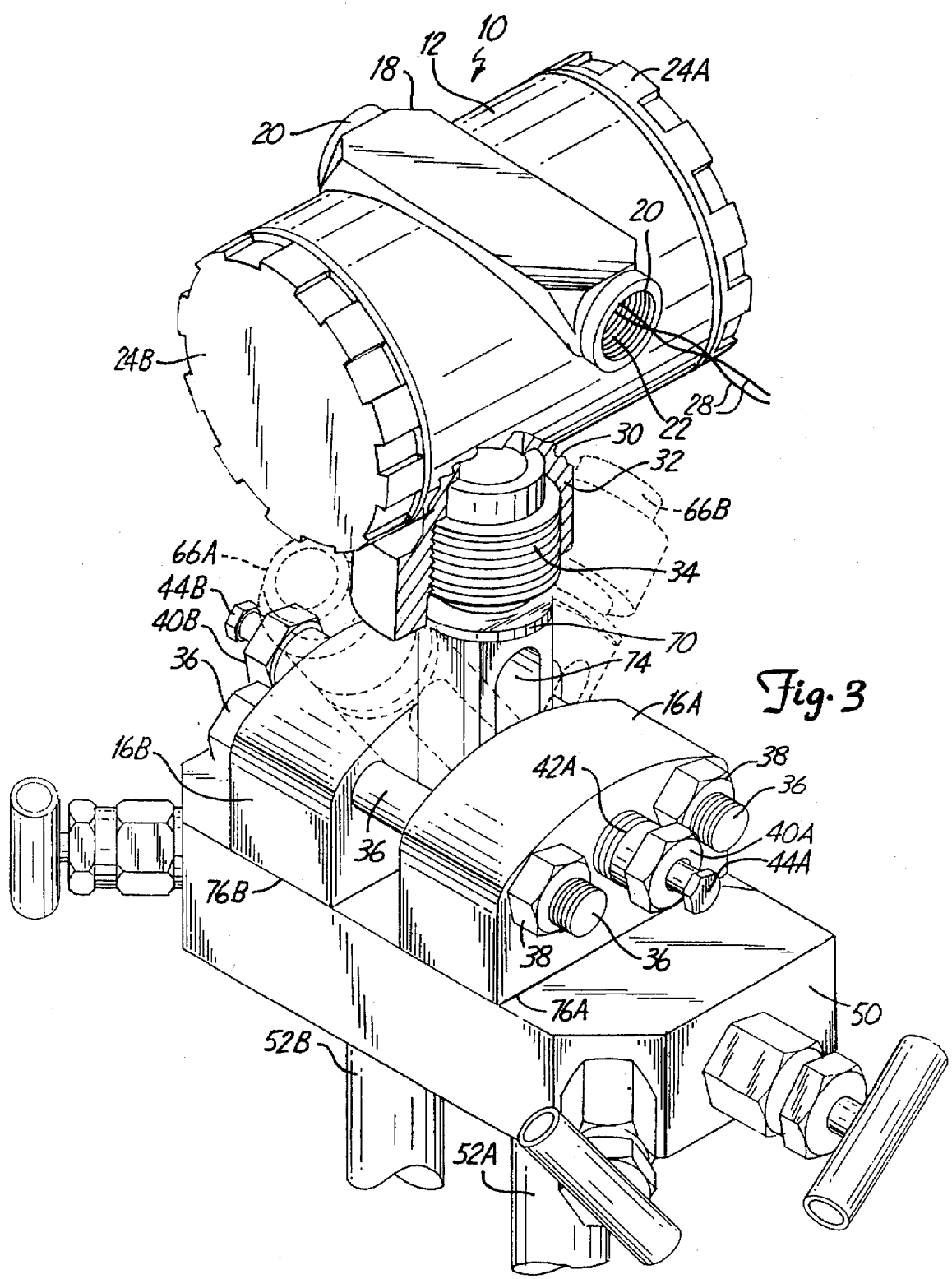
FIG. 3 is a perspective view of a transmitter and flange in accordance with another embodiment.
Figure 5:
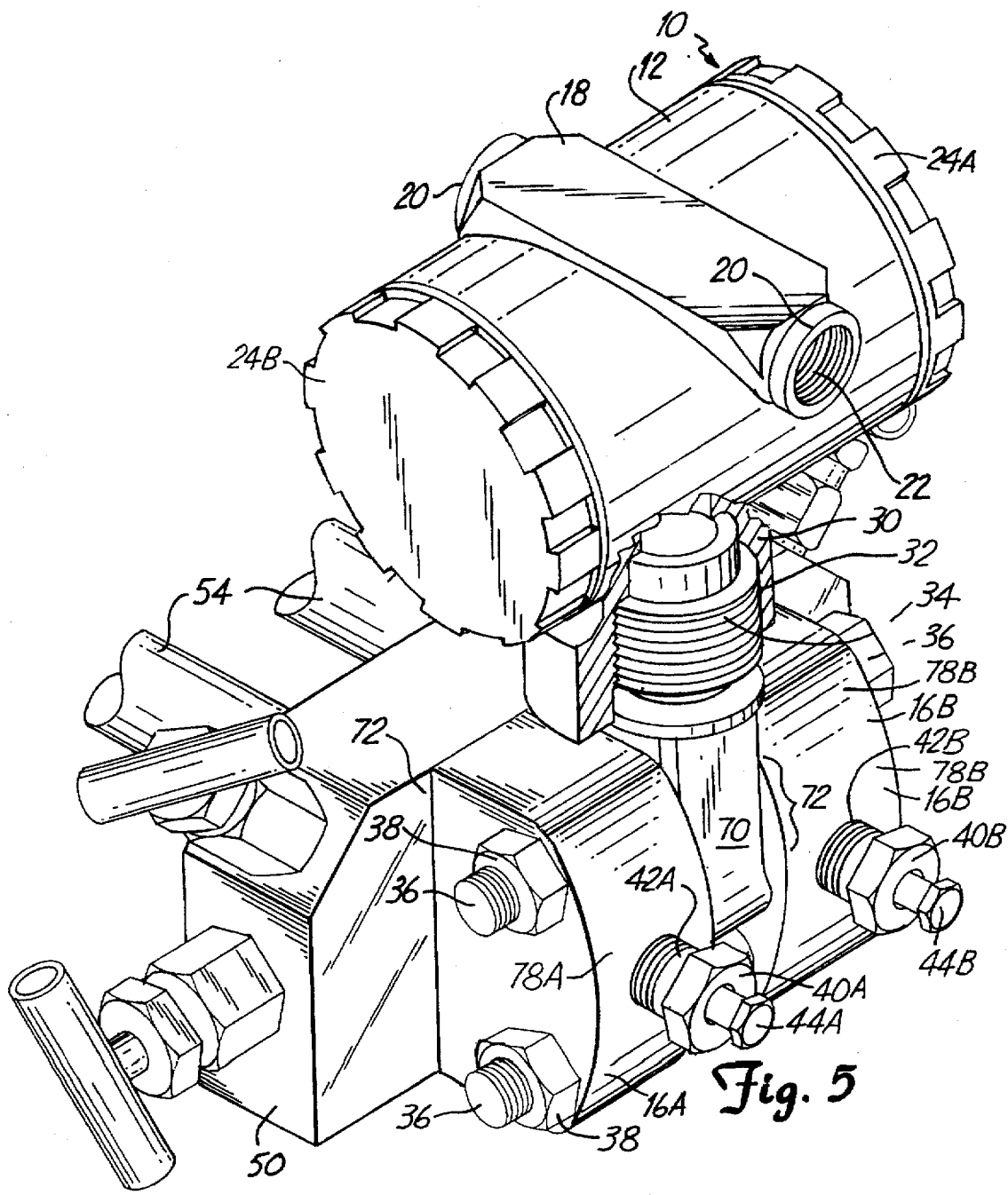
FIG. 5 is a perspective view of the embodiment of FIG. 3 showing the transmitter angled at 90° to the process interface.

FIG. 3 is a perspective view showing transmitter body 10 coupled to elongated sensor extension 70 in accordance with another embodiment. Elongated sensor extension 70 is shown in FIG. 4 in a perspective view in greater detail and is similar to sensor extension 14. Sensor extension 70 includes elongated mid portion 72 including a bolt hole 74 formed therethrough. Bolt hole 74 is adapted to receive bolts 36 therethrough. This allows transmitter 10 to be positioned at an angle of 90° relative to the process face 76A and 76B of flange interfaces 16A and 16B. As shown in FIG. 3, elongated sensor extension 70 may be rotated between positions 66A and 66B. For example, this may be between 80° and 100°. FIG. 5 shows this 90° orientation of transmitter 10 in a perspective view. Additionally, FIG. 5 shows an embodiment in which vent valves 40A and 40B are positioned on top face 78A and 78B of flange interfaces 16A and 16B, respectively. One of the bolts 36 extends through bolt hole 74 in elongated sensor extension 70. Note the elongated sensor extension 70 provides a greater overall height when comparing the embodiment of FIG. 3 with that of FIG. 1. However, because of the placement of bolts 36 and the widths of flange interfaces 16A and 16B, the embodiment of FIG. 1 using sensor extension 14 cannot be rotated to the 90° position of FIG. 5.

Figure 6:
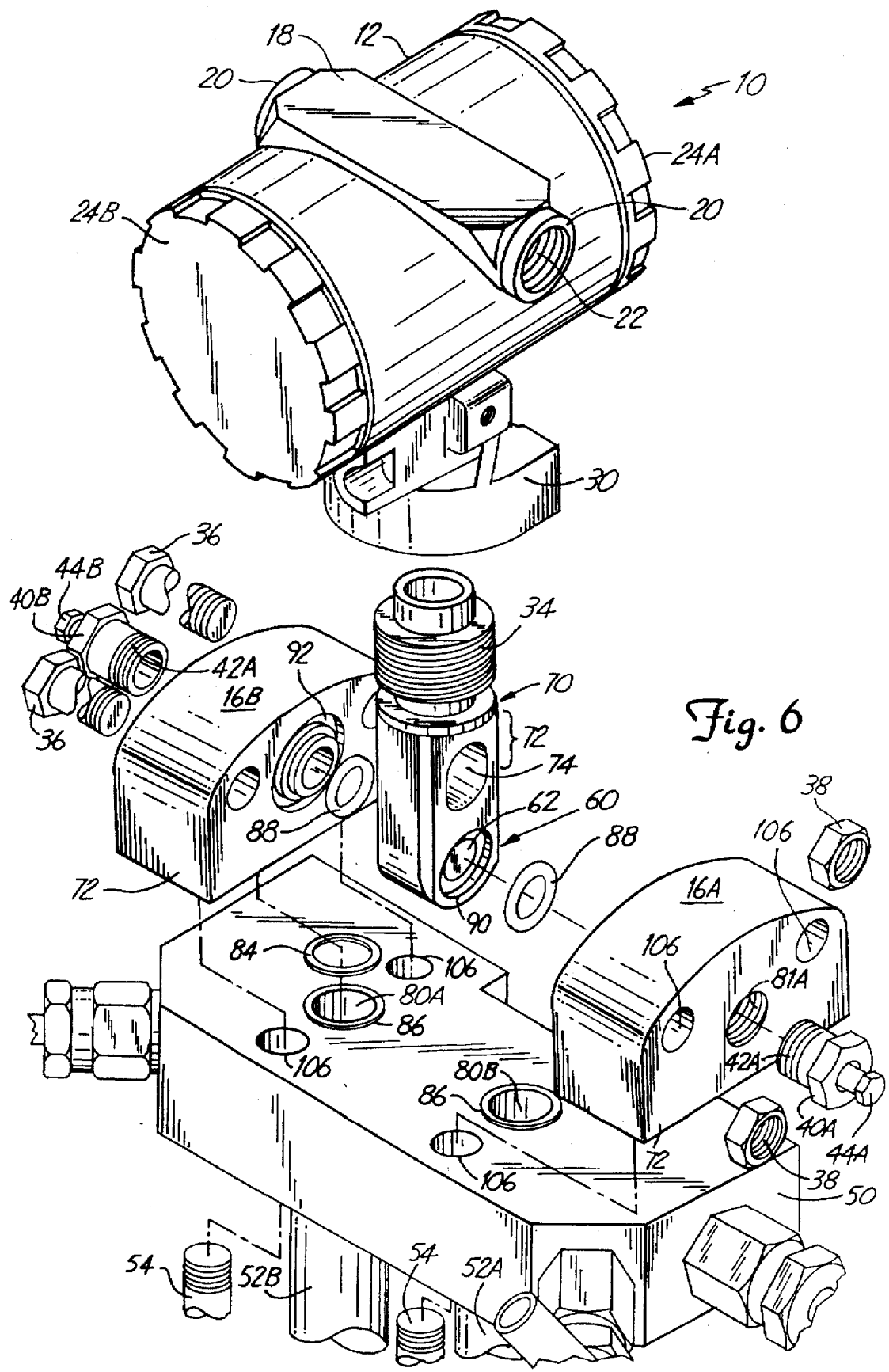
FIG. 6 is an exploded perspective view of the embodiment of FIG. 3.

FIG. 6 is an exploded perspective view showing transmitter 10 including an elongated sensor extension 70. As shown in FIG. 6, flange interfaces 16A and 16B coupled to process couplings 52A and 52B at process connections 80A and 80B, respectively. Vent valves 40A and 40B are received in vent valve opening 81A and opening 81B. Bolts 54 screw into flange interfaces 16A and 16B and O-ring 84 seats in O-ring seat 86 and secures process couplings 52A and 52B to interfaces 16A and 16B. Similarly, O-rings 88 seat in O-ring seats 90 of elongated sensor extension 70 and in O-ring seats 92 of flange interfaces 16A and 16B. O-rings 84 and 88 should be made of any appropriate elastomeric material. Preferably, the material should be resistant to corrosion from the process fluid.

Figure 7:
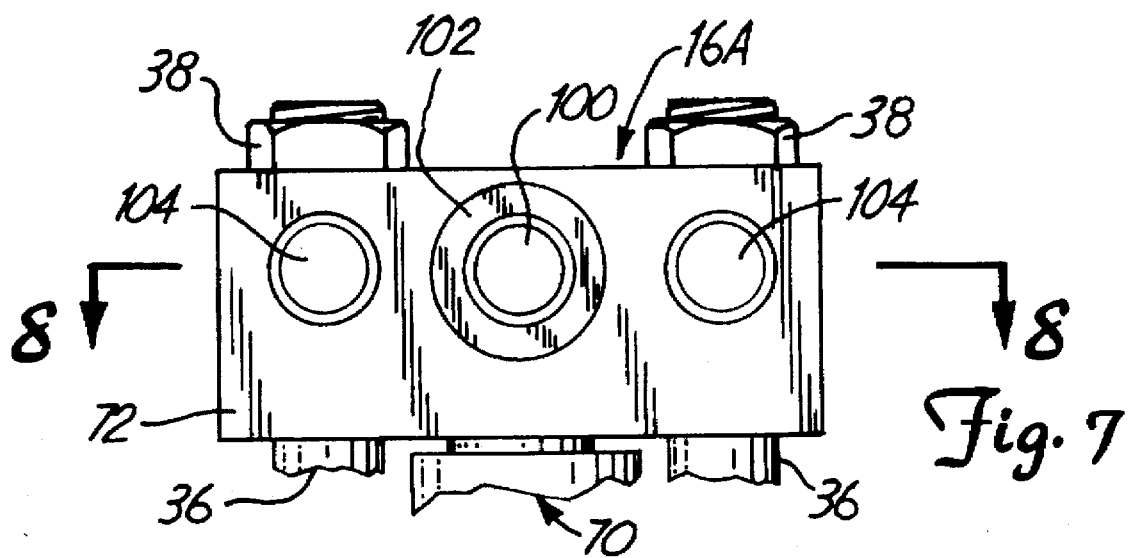
FIG. 7 is a bottom plan view of a flange interface showing the process connection.

FIG. 7 is a bottom plan view of flange interface 16A. In FIG. 7, a process connection 100 is shown which is surrounded by recess 102. Recess 102 is appropriate for receiving O-ring 84 (shown in FIG. 6) therein. Process connection 100 is positioned to align with process connection 80 shown in FIG. 6. Flange interface 16A also includes threaded bolt holes 104 which are positioned to align with bolt holes 106 shown in FIG. 6. Bolts 54 are received through holes 106 and may be screwed into threaded bolt holes 104 such that flange interfaces 16A and 16B are coupled to manifold 50.

Figure 8:
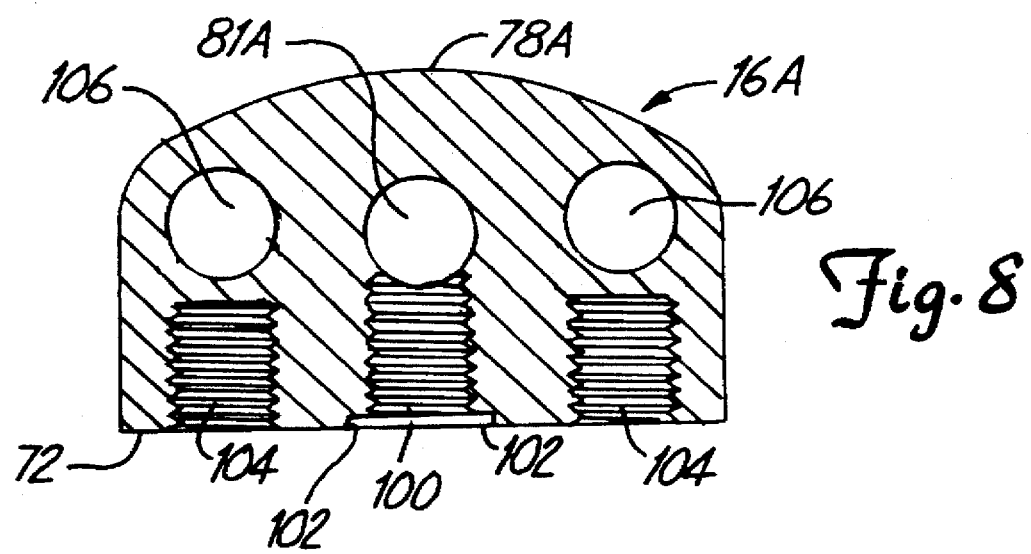
FIGS. 8A and 8B are cross sectional views of the flange interface.

FIG. 8 is a cross sectional view of flange interface 16A taken along the line labeled 8—8 in FIG. 7. FIG. 8 shows threaded bolt holes 104. FIG. 8 also shows bolt holes 106 for receiving bolts 36 therethrough. Process connection 100 may be threaded as shown in FIG. 8 if desired.

Process fluid is conveyed from impulse piping 52A and 52B through process connections 80 of manifold 50 and to process connections 100 of flange interfaces 16A and 16B. The process fluid is then applied to sensor interface 62 which, as explained above, could be an isolation diaphragm, through process connection 81A and 81B. It will be understood that a single process connection can be applied to one side of the sensor extension. Additionally, it is possible to provide flow through the sensor extension using the two paths described above whereby a sensor may be continuously exposed to circulating process fluid such that other types of measurements may be obtained, for example pH or temperature.

Figure 9:
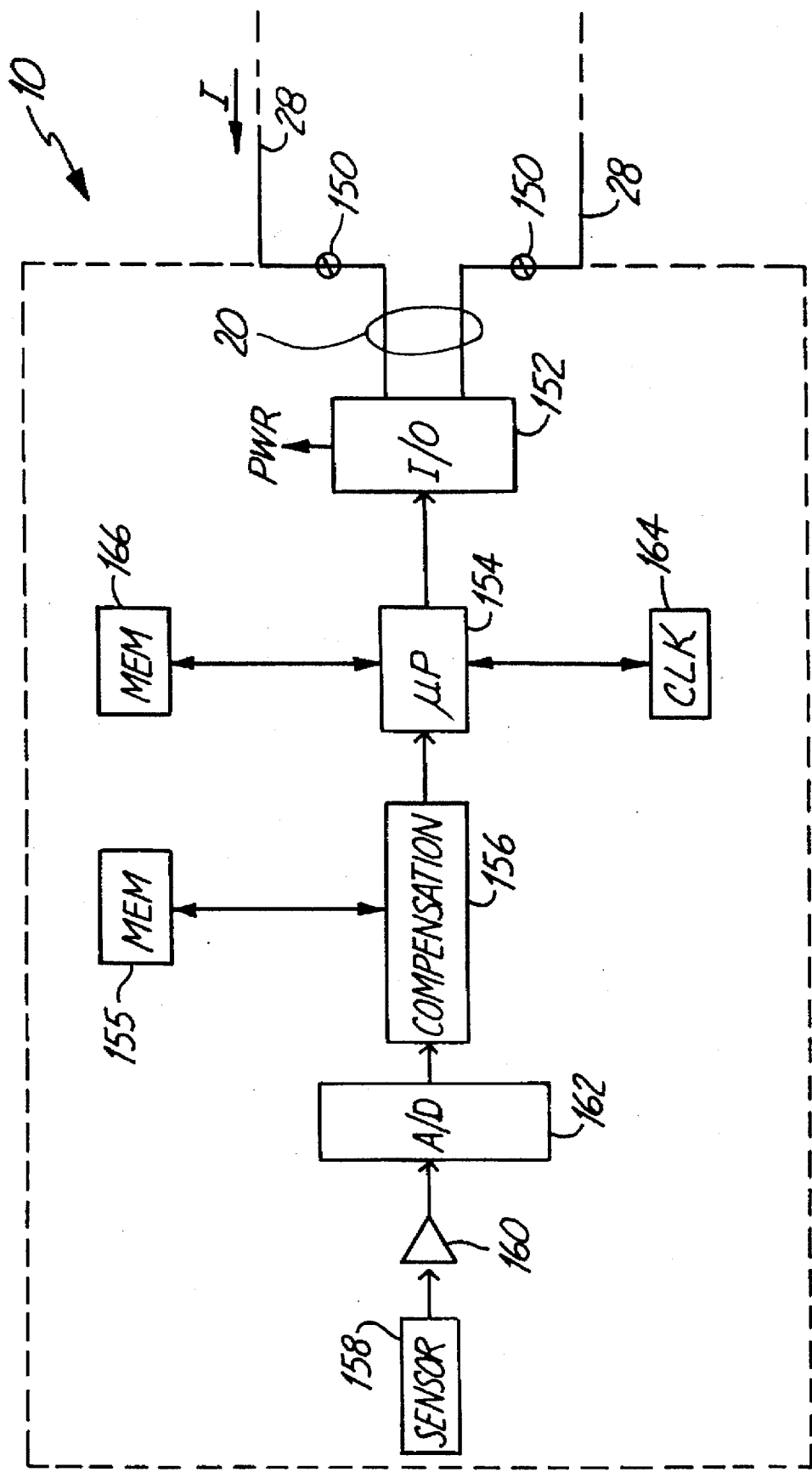
FIG. 9 is a simplified block diagram showing electrical circuitry of a transmitter.

FIG. 9 is a electrical schematic diagram of transmitter 10 coupled to process control loop wiring 28. Transmitter 10 couples to control loop wiring 28 at transmitter terminals 150. Transmitter 10 includes input/output circuitry 152, microprocessor 154, compensation circuitry 156 and sensor 158. Sensor 158 couples to compensation circuitry 156 through amplifier 160 and analog to digital conversion circuitry 162. The output of compensation circuitry couples to microprocessor 154 which is also connected to system clock 164 and memory 166. In operation, sensor 158 senses a process variable such as pressure, temperature, etc. The sensed process variable is amplified by amplifier 160 and digitized by analog to digital conversion circuitry 162. Compensation circuitry 156 operates to preprocess the process variable, for example compensating for errors in the process variable or converting the process variable into another variable, such as differential pressure into mass flow. The compensated process variable is provided to microprocessor 154 which operates in accordance with instructions stored in memory 166 and at a rate determined by system clock 164. Input/output circuitry 152 couples to control loop wiring 28 and allows microprocessor 154 to transmit information on loop wiring 28. Loop wiring 28 carries current I which is used by input/output circuitry 152 to provide a power output which issued to completely power transmitter 10. Additionally, microprocessor 154 is capable of receiving instructions over loop wiring 128 through input/output circuitry 152.

Figure 10:
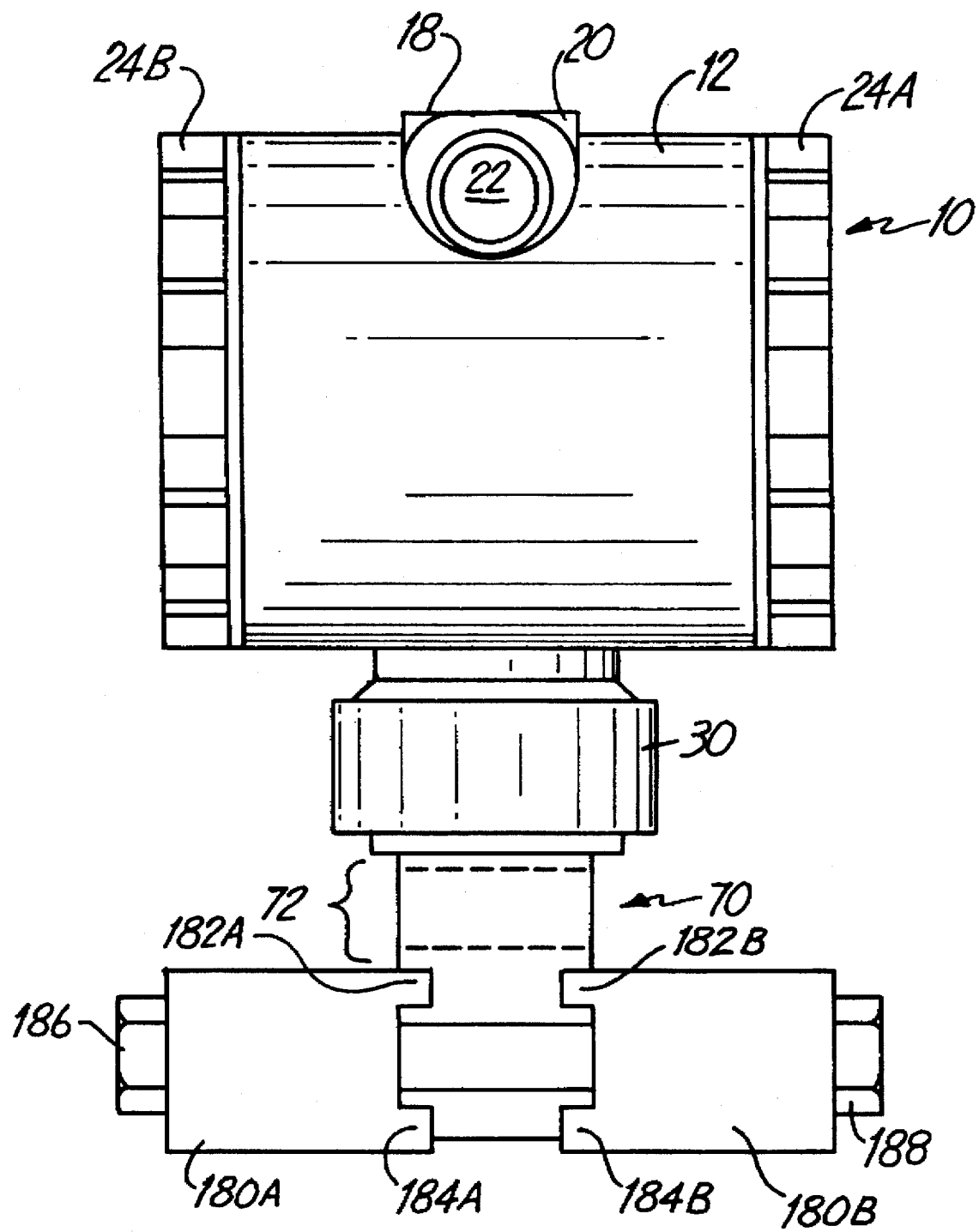
FIG. 10 is an elevated side plan view of a transmitter and flange interface in accordance with another embodiment.

FIG. 10 is a side elevated plan view of transmitter 10 coupled to flange interfaces 180A and 180B in accordance with another embodiment. Transmitter 10 is shown with sensor extension 70, however sensor extension 14 of FIG. 2 may also be used. Interfaces 180A and 180B include upper keys 182A and 182B and lower keys 184A and 184B, respectively.

Figure 11:
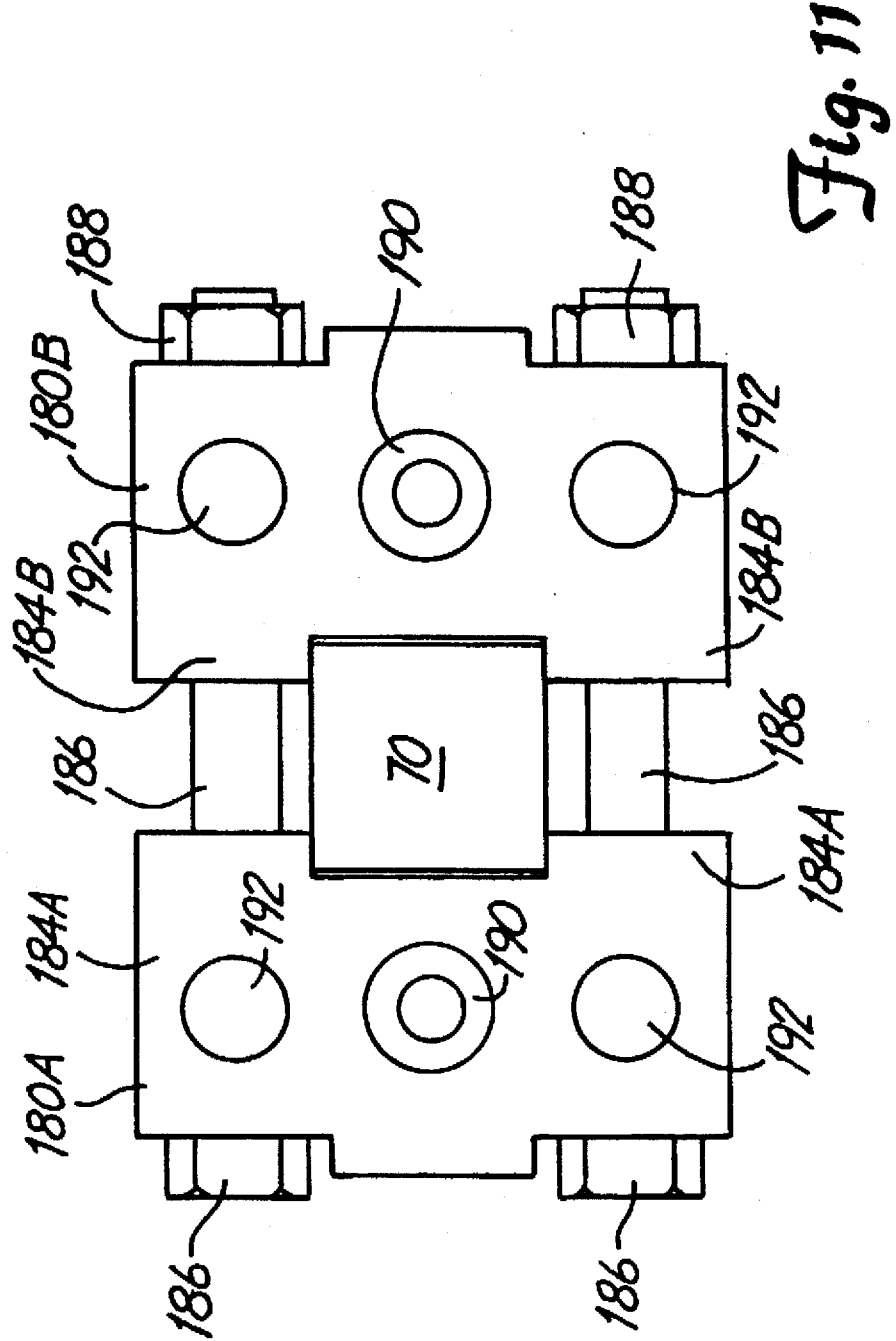
FIG. 11 is a bottom plan view of the transmitter and flange interface of FIG. 10.

FIG. 11 is a bottom plan view showing flange interfaces 180A and 180B and sensor extension 70. Flange interfaces 180A and 180B carry process connections 190 and bolt holes 192. Sensor extension 70 is secured between keys 182A and 182B on one side of the sensor interface (not shown in FIGS. 10 and 11) and lower keys 184A and 184B on the other side of the sensor interface. This provides additional stability and prevents rotation of sensor extension 70 and transmitter 10 about the sensor interface held between flange interfaces 180A and 180B. In addition to the configuration shown in FIGS. 10 and 11, transmitter 10 may be rotated 90° such that it is secured between keys 182A and 184A on one side and keys 182B and 184B on the other side.

Figure 12:
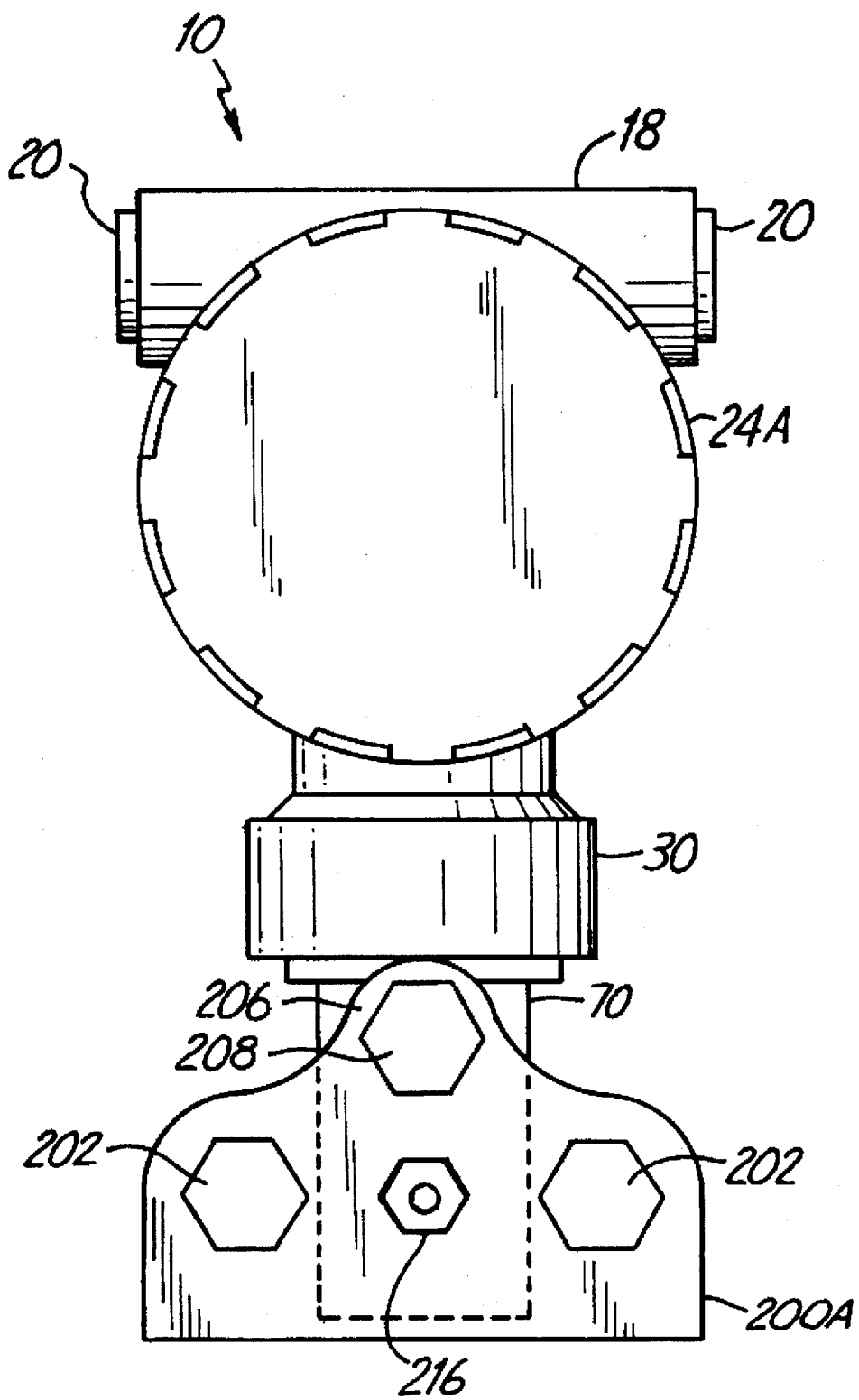
FIG. 12 is a front elevated plan view of a transmitter and flange interface in accordance with another embodiment.
Figure 13:
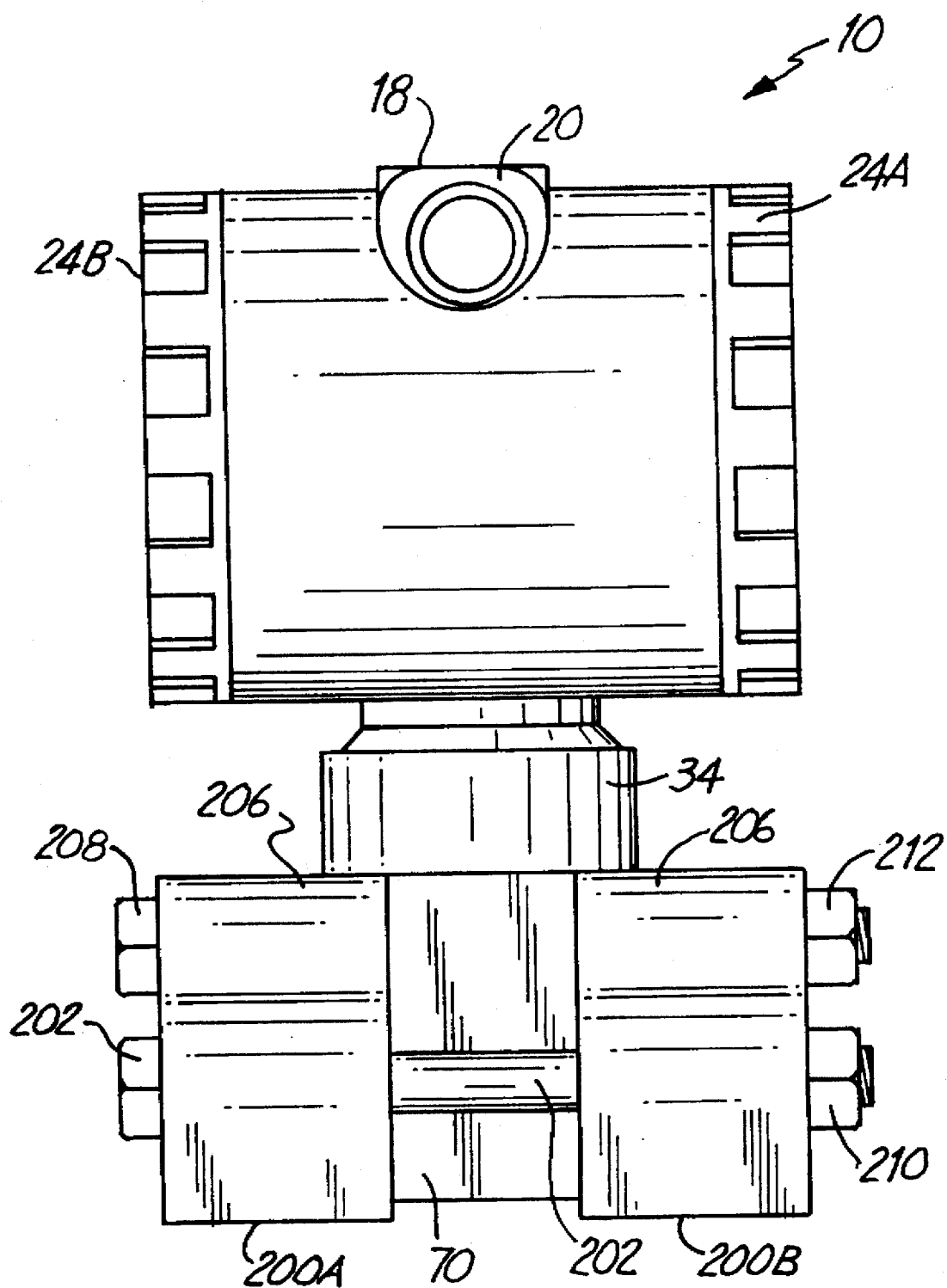
FIG. 13 is a side elevated plan view of the transmitter and flange interface of FIG. 12.

FIG. 12 is a front elevated plan view and FIG. 13 is a side elevated plan view of transmitter 10 coupled to flange interfaces 200A and 200B in accordance with another embodiment. Transmitter 10 is shown with sensor extension 70 secured between flange interfaces 200A and 200B using bolts 202 which are secured by nuts 210. Interfaces 200A and 200B include extensions 206 which contain bolt holes (not shown) extending therethrough. These bolt holes receive bolt 208 which extends through bolt hole 74 of sensor extension 70 and is secured by nut 212 shown in FIG. 13. This third bolt 208 secures transmitter 10 in the upright position shown in FIGS. 12 and 13 and prevents rotation of transmitter 10 relative to interfaces 200A and 200B. A vent valve 216 may also be included in this embodiment.

FIG. 14 is a cut away view in accordance with another embodiment of manifold 222 showing set bolt 224 which secures sensor extension 14 to unitary manifold 222. Manifold 222 includes integral interface flanges 226A and 226B. As shown in the cut away view of flange 226A, a process passageway 228 is formed therethrough which couples to process piping 52A through set bolt notch 237. Set bolt notch 237 couples through process fluid entry hole 230 into piping passageway 234. Threaded passageway 232 of piping passageway 234 couples to process fluid entry hole 230 and vent 250 which includes vent stem 252. Set bolt 224 includes pressure plate 236. In operation, set bolt 224 is tightened to securely couple process fluid to process connection 62 through passageway 234 and to secure sensor extension 14 to manifold 222. O-rings 238 seat against flange 239 and threaded passageway 241. Pressure plate 236 seats against O-ring 88 at O-ring seat 240 providing a fluidic seal therebetween.

The embodiment of FIG. 14 has a reduced number of seals and cavities, and a single attachment bolt. This embodiment reduces the number of connections that must be sealed by O-rings and bolts. This reduces the chance of process fluid leakage and the likelihood of human error. Additionally, fabrication costs are reduced because there are fewer precision machined parts. One skilled in the art will recognize that any technique for coupling the unitary manifold to the sensor extension may be employed.

The present invention has a number of advantages. The invention allows for a reduced size in the overall transmitter and coupling apparatus used to couple to the process fluid. The reduced size allows transmitters to be used in small spaces and reduces the amount of material needed to manufacture transmitters. In one preferred embodiment, the flange interfaces are formed of 316 stainless steel and are resistant to corrosion from the process fluid. Other factors used in determining what materials should be used include the temperature range, expansion coefficients and ease of manufacturability of the material. Because of the reduced size, the various flanges and couplings are also easier to seal than larger sized elements. The transmitter may be easily rotated between zero and 90° relative to the process connection. The reduced size also allows for reduced overall weight making shipping and transportation of the devices more practical. In one embodiment, memory 155 along with various combinations of sensor 158, amplifier 160, analog to digital conversion circuitry 162 and compensation circuitry 156 may reside in the sensor extension. In this embodiment, sensor extensions for a specific task may be connected to a generic transmitter body. In one preferred embodiment, the interface flanges provide standard DIN spacing of 2⅛" and ¼ NPT.

Various embodiments of the present invention include placement of the various orifices and openings and any desired configuration using any appropriate internal passageway system. The various pieces may be fit together using techniques other than those specifically disclosed herein and all such techniques are considered to be within the scope of the present invention. For example, attachment mechanisms other than the bolts and screws specifically set forth may be used. Furthermore, a single interface flange may be used in embodiments where only a single process connection is required such as, absolute pressure or temperature measurement. Further still, it should be understood that the interface flanges may be used with other sensor and transmitter configurations and are not limited to the specific sensor extension and transmitter body set forth herein. Any or all of the pieces may be formed individually or integral with each other. The sensor and/or sensor extension could be a part of the interface flange and/or manifold. The concepts set forth herein may be applied to more than two process connections.

Although the present invention has been described with reference to preferred embodiments, workers skilled in the art will recognize that changes may be made in form and detail without departing from the spirit and scope of the invention.

What is claimed is:

1. A transmitter of the type used in the process control industry for sensing a process variable of a process fluid, the transmitter comprising:

a transmitter body having a sensor coupling;

a sensor extension coupled to the sensor coupling, the sensor extension having a sensor coupling face and an opposing face opposite the sensor coupling face;

a first flange interface having a process face which connects to the process and a sensor coupling face which mates with the sensor, the first flange interface including a passageway which couples the process fluid to the sensor coupling face;

a second flange interface positioned adjacent the opposing face of the sensor extension whereby the sensor extension is positioned between the first and second flange interfaces; and coupling means for coupling the first flange interface to the second flange interface whereby the sensor extension is held therebetween and completely secured between the first and second flange interfaces by force applied by the coupling means, the sensor extension selectively positionable at a plurality of angles relative to the process face.

2. The transmitter of claim 1 wherein the sensor extension includes features on the sensor coupling face and the opposing face and the first flange interface includes features which conform to sensor coupling face and the second flange interface includes features which conform to the opposing face, the feature provided to enhance coupling of the sensor extension to the first and second flange interfaces.

3. The transmitter of claim 1 wherein the second flange interface includes a process face and a passageway extending between the process face and a face adjacent the opposing face of the sensor extension.

4. The transmitter of claim 1 including first and second vent plugs in the respective first and second flange interfaces.

5. The transmitter of claim 1 wherein the coupling means comprises at least two bolts positioned on opposing sides of the sensor extension.

6. The transmitter of claim 1 wherein the sensor extension is selectively continuously positionable at an angle relative to the process face of between less than about 80° and more than about 100°.

7. The transmitter of claim 1 wherein at least one flange interface includes a key adapted to receive the sensor extension therein to prevent rotation of the sensor extension relative to the first and second flange interfaces.

8. The transmitter of claim 7 wherein the key maintains the sensor extension at an angle of about 90° relative to the process face.

9. The transmitter of claim 5 wherein the sensor extension includes a bolt hole for receiving a bolt therethrough.

10. The transmitter of claim 9 wherein the sensor extension is positioned at an angle of about 90° relative to the process face and the bolt hole receives a third bolt therethrough.

11. The transmitter of claim 9 wherein the sensor extension is positioned generally parallel with the process interface and at least one flange interface includes a key which maintains the sensor extension in position relative to the process interface.

12. The transmitter of claim 1 wherein the first and second flange interfaces are part of a unitary manifold.

13. A flange for coupling to a transmitter of the type used to sense a process variable of a process fluid having a transmitter body and a sensor extension coupled to the sensor coupling, the sensor extension having a sensor coupling face and an opposing face opposite the sensor coupling face, the transmitter flange comprising:

a first flange interface having a process face which connects to the process and a sensor coupling face which mates with the sensor, the first flange interface including a passageway which couples the process fluid to the sensor coupling face;

a second flange interface positioned adjacent the opposing face of the sensor extension whereby the sensor extension is positioned between the first and second flange interfaces; and coupling means for coupling the first flange interface to the sensor extension second flange interface whereby the sensor extension is held therebetween and completely secured between the first and second flange interfaces by force applied by the coupling means, the sensor extension selectively positionable at a plurality of angles relative to the process face.

14. The transmitter of claim 13 wherein the sensor extension includes features on the sensor coupling face and the opposing face and the first flange interface includes features which conform to sensor coupling face and the second flange interface includes features which conform to the opposing face, the feature provided to enhance coupling of the sensor extension to the first and second flange interfaces.

15. The transmitter of claim 13 wherein the second flange interface includes a process face and a passageway extending between the process face and a face adjacent the opposing face of the sensor extension.

16. The transmitter of claim 13 including first and second vent plugs in the respective first and second flange interfaces.

17. The transmitter of claim 13 wherein the coupling means comprises at least two bolts positioned on opposing sides of the sensor extension.

18. The transmitter of claim 13 wherein the sensor extension is selectively continuously positionable at an angle relative to the process face of between less than about 80° and more than about 100°.

19. The transmitter of claim 13 wherein at least one flange interface includes a key adapted to receive the sensor extension therein to prevent rotation of the sensor extension relative to the first and second flange interfaces.

20. The transmitter of claim 19 wherein the key maintains the sensor extension at an angle of about 90° relative to the process face.

21. The transmitter of claim 17 wherein the sensor extension includes a bolt hole for receiving a bolt therethrough.

22. The transmitter of claim 21 wherein the sensor extension is positioned at an angle of about 90° relative to the process face and the bolt hole receives a third bolt therethrough.

23. The transmitter of claim 21 wherein the sensor extension is positioned generally parallel with the process interface and at least one flange interface includes a key which maintains the sensor extension in position relative to the process interface.

24. The transmitter of claim 13 wherein the first and second flange interfaces are part of a unitary manifold.

* * * * *

UNITED STATES PATENT AND TRADEMARK OFFICE
CERTIFICATE OF CORRECTION

PATENT NO. : 5,668,322
DATED      : September 16, 1997
INVENTOR(S): David A. Broden It is certified that error appears in the above-indentified patent and that said Letters Patent is hereby corrected as shown below:

Col. 2, line 15, delete "FIGS. 8A and 8B are cross sectional views" and insert --FIG. 8 is a cross sectional view--.

Signed and Sealed this

Nineteenth Day of May, 1998

Attest:

BRUCE LEHMAN

*Attesting Officer*    *Commissioner of Patents and Trademarks*